US012708113B2

(12) United States Patent
Tanuwidjaja et al.

(10) Patent No.: US 12,708,113 B2
(45) **Date of Patent: *Aug. 18, 2026**

(54) HERBICIDAL COMPOSITIONS AND METHODS OF USE THEREOF

(71) Applicant: Valent U.S.A. LLC, Walnut Creek, CA (US)

(72) Inventors: Jessica Tanuwidjaja, Fremont, CA (US); Tak Wai Cheung, Mountain House, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 814 days.

This patent is subject to a terminal disclaimer.

(21) Appl. No.: 17/698,165

(22) Filed: Mar. 18, 2022

(65) Prior Publication Data

US 2022/0211033 A1 Jul. 7, 2022

Related U.S. Application Data

(63) Continuation of application No. 16/227,324, filed on Dec. 20, 2018, now abandoned.

(60) Provisional application No. 62/613,114, filed on Jan. 3, 2018.

(51) Int. Cl.

| | |
|---|---|
| ***A01N 25/04*** | (2006.01) |
| ***A01N 37/38*** | (2006.01) |
| ***A01N 37/40*** | (2006.01) |
| ***A01N 43/707*** | (2006.01) |
| ***A01N 43/84*** | (2006.01) |
| ***A01N 43/90*** | (2006.01) |
| ***A01N 57/20*** | (2006.01) |

(52) U.S. Cl.

CPC ............. *A01N 25/04* (2013.01); *A01N 37/38* (2013.01); *A01N 37/40* (2013.01); *A01N 43/707* (2013.01); *A01N 43/84* (2013.01); *A01N 43/90* (2013.01); *A01N 57/20* (2013.01)

(58) Field of Classification Search

CPC ........ A01N 25/04; A01N 37/38; A01N 37/40; A01N 43/707; A01N 43/84; A01N 43/90; A01N 57/20

See application file for complete search history.

(56) References Cited

U.S. PATENT DOCUMENTS

| | | | | |
|---|---|---|---|---|
| 5,990,048 A * | 11/1999 | Dahmen | C07D 471/04 | 504/136 |
| 11,684,068 B2 * | 6/2023 | Tanuwidjaja | A01N 43/707 | 504/128 |
| 2011/0065579 A1 * | 3/2011 | Sievernich | A01N 43/76 | 504/128 |
| 2016/0174551 A1 * | 6/2016 | Shroff | A01N 25/04 | 504/136 |
| 2018/0235208 A1 * | 8/2018 | Faers | A01N 43/653 | |

FOREIGN PATENT DOCUMENTS

| | | | |
|---|---|---|---|
| CN | 101953335 B * | 11/2012 | |
| WO | WO-2017083409 A2 * | 5/2017 | A01N 25/04 |

OTHER PUBLICATIONS

Flumioxazin, Monograph [online]. Merck Index Online, 2024 [retrieved on Sep. 30, 2024]. Retrieved from the Internet: < https://merckindex.rsc.org/monographs/m5444>, 3 pages. (Year: 2024).*

Ammonium Sulfate, Monograph [online]. Merck Index Online, 2024 [retrieved on Sep. 30, 2024]. Retrieved from the Internet:<https://merckindex.rsc.org/monographs/m1822>, 4 pages. (Year: 2024).*

Solution, True, Hawley's Condensed Chemical Dictionary, [online] 2007 [retrieved on Apr. 14, 2025]. Retrieved from the Internet:<https://onlinelibrary.wiley.com/doi/10.1002/9780470114735.hawley14956>, 3 pages. (Year: 2007).*

* cited by examiner

*Primary Examiner* — Ali Soroush
*Assistant Examiner* — Andriae M Holt
(74) *Attorney, Agent, or Firm* — Wood, Phillips, Katz, Clark & Mortimer

(57) ABSTRACT

The present invention is directed to an herbicidal composition comprising metribuzin, a salting-out agent and polyvinyl alcohol. The present invention is further directed to a method of controlling weeds comprising applying a composition of the present invention to the weeds or an area in need of weed control.

5 Claims, 1 Drawing Sheet

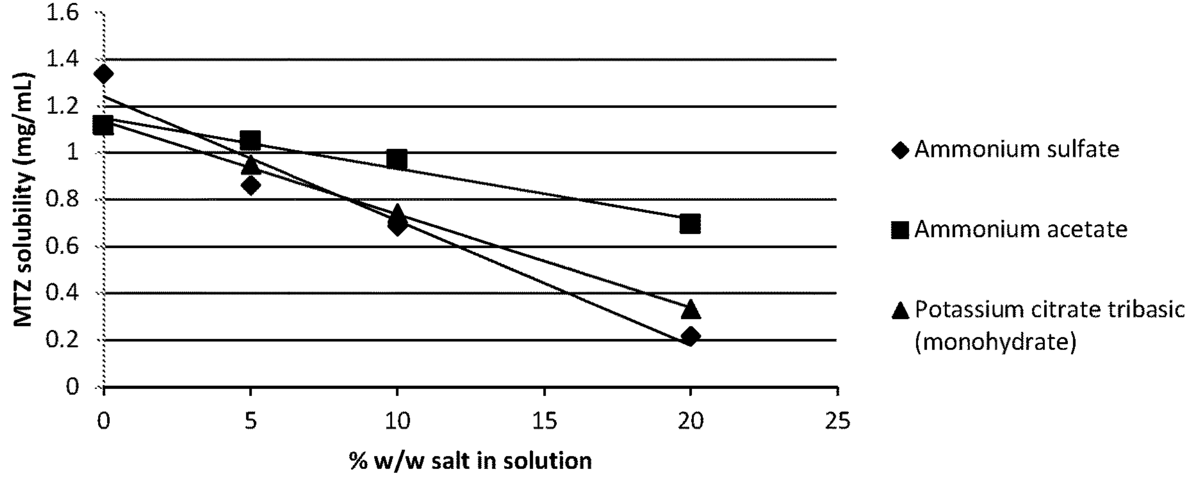
1.6
1.4
1.2
1
0.8
0.6
0.4
0.2
0
MTZ solubility (mg/mL)
0
5
10
15
20
25
% w/w salt in solution
Ammonium sulfate
Ammonium acetate
Potassium citrate tribasic (monohydrate)

HERBICIDAL COMPOSITIONS AND METHODS OF USE THEREOF

FIELD OF THE INVENTION

The present invention relates to an aqueous herbicidal composition comprising metribuzin, a salting-out agent and polyvinyl alcohol. The present invention further relates to a method of controlling weeds comprising applying a composition of the present invention to the weeds or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, *Horseweed* (*Conyza Canadensis*) *control in no-tillage soybeans* (*Glycine max*) *with preplant and preemergence herbicides*, Weed Technol. 4:642-647 (1990). Therefore, controlling weeds is a major concern of crop growers. Unwanted plants in crop plant environments include broadleaves, grasses and sedges.

Roundup Powermax® (available from Monsanto Technology LLC) and other high-electrolyte herbicide formulations utilizing glyphosate or dicamba, have become widely used in areas in need of weed control. For example, there are many varieties of agricultural crops, such as soybeans, corn, cotton and wheat that are resistant to glyphosate or dicamba making its use to control weeds among these crops ideal. However, significant increase in the area where glyphosate is applied leads to an increase in the potential infestation of glyphosate-resistance weeds. For controlling glyphosate-resistant weeds, glyphosate and dicamba formulations are often added to tank mixes of other herbicidal formulations having a different mode of action.

Often, when multiple herbicides are applied concurrently they are added as suspension concentrates to form a tank mix prior to application. However, when adding multiple herbicide formulations to form a tank mix the user must ensure that the formulations are mixed homogenously to ensure good spray characteristics and consistent delivery of the active ingredients throughout the application area. Despite its popularity, many current herbicide formulations do not have good mixing behavior with Roundup Powermax® and other high-electrolyte herbicide formulations.

Protoporphyrinogen oxidase ("PPO") inhibitors are used as herbicides to control weeds among soybeans, peanuts, orchard fruits and many other agricultural crops in the United States and worldwide. Common PPO inhibitors used in the United States include acifluorfen-sodium, fomesafen, lactofen, oxyfluorfen, flumiclorac, flumioxazin, oxadiazon, saflufenacil, fluthiacet-methyl, carfentrazone-ethyl and sulfentrazone. These herbicides are effective in controlling glyphosate-resistant and tough-to-control weeds.

Metribuzin is a photosynthesis inhibiting herbicide used to control weeds among many agricultural crops including soybeans, potatoes, tomatoes and sugar cane. Metribuzin is often combined in the field with aqueous high-electrolyte herbicide formulations. For handling purposes during tank-mixing, it is most convenient to formulate metribuzin in the liquid (flowable) form. It would be even more desirable to obtain an aqueous suspension (rather than systems incorporating organic solvents), for environmental safety and phytotoxicity purposes. However, metribuzin is partially water soluble (1050 mg/L at 20° C.) causing it to be prone to crystal growth in these aqueous formulations via Ostwald ripening.

Accordingly, there is a need in the art for herbicide compositions that can stabilize metribuzin in an aqueous formulation and have favorable mixing characteristics (e.g. homogeneity and suspensibility) with Roundup Powermax® and other high-electrolyte herbicide formulations.

SUMMARY OF THE INVENTION

In one embodiment, the present invention is directed to an aqueous herbicidal composition comprising metribuzin, a salting-out agent and polyvinyl alcohol.

In another embodiment, the present invention is directed to a method of controlling weeds comprising applying a composition of the present invention to the weeds or an area in need of weed control.

BRIEF DESCRIPTION OF THE DRAWINGS

FIG. 1. Metribuzin solubility in salt solutions.

DETAILED DESCRIPTION OF THE INVENTION

Salts are known to affect solubility of protein in water. In a process known as "salting-out", salts are added to aqueous protein solutions to lower the water solubility and precipitate out the protein. This process is commonly used in the early and later stages of protein purification process.

Applicant discovered that the "salting-out" properties can likewise be utilized to lower metribuzin solubility in aqueous solutions. See FIG. 1. In an aqueous suspension, this lowering of metribuzin solubility prevents dissolution of the suspended particles, which is the first step in Ostwald ripening, and thus reduces particle size growth. These salting-out agents have advantages over prior art agents used to stabilize metribuzin such as dispersants derived from sulfonated lignins. These dispersants also control particle size growth due to Ostwald ripening, such as that seen with metribuzin. However, Applicant has demonstrated that suspensions utilizing sulfonated lignins rapidly flocculate and settle in mixtures having a high electrolyte concentration. This flocculation and settling likely will lead to inhomogeneity with high-electrolyte herbicides such as Roundup Powermax® and dicamba, thus reducing the benefits of co-application.

Applicant further discovered that the addition of polyvinyl alcohol further inhibited crystal formation in aqueous metribuzin compositions.

In one embodiment, the present invention is directed to an aqueous herbicidal composition comprising:

metribuzin;

a salting-out agent; and polyvinyl alcohol.

In another embodiment, the present invention is directed to an aqueous herbicidal composition comprising:

metribuzin;

flumioxazin;

a salting-out agent; and polyvinyl alcohol.

In a preferred embodiment, metribuzin is present at a concentration from about 1% to about 50% w/w, from about 1% to about 45% w/w, from about 1% to about 38% w/w, from about 10% to about 20% w/w, from about 15% to about 17% w/w, about 15.9% w/w or about 15.86% w/w.

As used herein, "salting-out agent" or "salting-out agents" are compounds that lower the water solubility of metribuzin.

In a preferred embodiment, the salting-out agent is a salt having a molecular weight less than about 500 grams per mole and a water solubility of greater than about 20% w/w at a temperature from about 20 to about 25 degrees Celsius.

In a preferred embodiment, the salting-out agent is a salt having a cation selected from the group consisting of aluminum, ammonium, potassium, sodium, lithium, magnesium, calcium and iron and or an anion selected from the group consisting of citrate, tartrate, fluoride, sulfate, sulfonate, phosphate/hydrogenphosphate, acetate, chloride, nitrate, bromide, chlorate, iodide, perchlorate and thiocyanate. More preferably, the salting-out agent is selected from ammonium sulfate, ammonium acetate and potassium citrate.

In another preferred embodiment, the salting-out agent is present at a concentration from about 1% to about 10% w/w, from about 1% to about 6% w/w, from about 1.8% to about 3.5% w/w, about 2.8% w/w or about 2.9% w/w.

In another preferred embodiment, the polyvinyl alcohol is present at a concentration from about 1% to about 10% w/w, from about 1% to about 5% w/w, from about 1.2% to about 3.5% w/w, about 1.5% w/w, about 2.0% w/w, about 2.8% w/w or about 2.9% w/w.

In another preferred embodiment, the present invention is directed to an aqueous herbicidal composition comprising:

from about 10% to about 20% w/w metribuzin;

optionally, from about 1% to about 30% w/w of flumioxazin;

from about 1% to about 6% w/w of a salt selected from ammonium sulfate, ammonium acetate and potassium citrate; and from about 1% to about 5% w/w polyvinyl alcohol.

In another preferred embodiment, the present invention is directed to an aqueous herbicidal composition comprising:

from about 15% to about 17% w/w metribuzin;

optionally, from about 4% to about 24% w/w flumioxazin;

ammonium sulfate at a concentration from about 1.8% to about 3.5% w/w; and polyvinyl alcohol at a concentration from about 1.2% to about 3.5% w/w.

from about 3% to about 4% w/w of a 35% acrylic graft copolymer;

from about 1.5% to about 2% w/w of an alkylphenol ethoxylate free nonionic wetter;

about 4% w/w propylene glycol;

about 0.1% w/w of a silicone emulsion;

about 0.15% w/w of a mixture of 1.15% 5-chloro-2-methyl-4-isothiazolin-3-one and 0.35% 2-methyl-4-isothiazolin-3-one; and about 1% w/w magnesium aluminum silicate.

As used herein the term "protoporphyrinogen oxidase (PPO) inhibitor," "PPO inhibitor" or "PPO inhibitors" refers to any compound capable of inhibiting the oxidation of protoporphyrinogen through interaction with the protoporphyrinogen oxidase enzyme, including those compounds not yet discovered or synthesized. Current PPO inhibitors include, but are not limited to, diphenylethers such as acifluorfen-sodium, bifenox, chlornitrofen, chlomethoxyfen, ethyoxyfen-ethyl, fluoroglycofen-ethyl, fomesafen, lactofen and oxyfluorfen, N-phenylphthalimides such as cinidon-ethyl, flumiclorac and flumioxazin, oxadiazoles such as oxadiargyl and oxadiazon, oxazolidinediones such as pentoxazone, phenylpyrazoles such as fluazolate and pyraflufen-ethyl, pyrimidindiones such as benzfendizone, butafenacil and saflufenacil, thiadiazoles such as fluthiacet-methyl and thidiazimin, triazolinones such as azafenidin, carfentrazone-ethyl and sulfentrazone and others such as flufenpyr-ethyl, profluazol and pyraclonil.

In a preferred embodiment, the PPO inhibitor of the present invention has a melting point of about 100° C. or greater and a water solubility of about 200 milligrams per liter or less.

In a preferred embodiment, the PPO inhibitor is present at a concentration from about 1% to about 30% w/w, from about 4% to about 24% w/w or about 12.1% w/w.

In a preferred embodiment, the PPO inhibitor is flumioxazin.

Compositions of the present invention may further comprise one or more excipients selected from the group consisting of a surfactant, an antifoaming agent, an antifreeze agent, a preservative and a thickener.

Surfactants suitable for use in the present invention include, but are not limited to, polyoxyethylene aryl or alkyl phosphates or sulfates such as potassium salt of polyoxyethylene tristyrylphenol phosphate, dodecylbenzene sulfonate salts, methyloxirane polymer, styrene methacrylic copolymer, polyvinylpyrrolidone and methyl vinyl ether/maleic acid half ester copolymer, acrylic graft copolymers and an alkylphenol ethoxylate free nonionic wetter.

In another preferred embodiment, the 35% acrylic graft copolymer may be present at a concentration from about 0.1% to about 5% w/w, more preferably from about 2% to about 5% w/w and most preferably about 3% w/w or about 4% w/w.

In another preferred embodiment, the 35% acrylic graft copolymer has a density of 1.07 g/mL at 25° C., a flash point of greater than 100° C., a pour point of less than 0° C. and a viscosity of 200 mPa·s at 25° C.

In another preferred embodiment, the alkylphenol ethoxylate free nonionic wetter may be present at a concentration from about 0.1% to about 5% w/w, from about 1% to about 3% w/w or about 1.5% w/w or about 2% w/w.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonyl- and phenylpolyoxyethylene/ethylene oxide units is >5) and long-chain alcohols and mixtures thereof. In a preferred embodiment, the antifoaming agent is a silicone emulsion. Antifoaming agents may be present at a concentration from about 0.01% to about 1% w/w, from about 0.05% to about 0.5% w/w or about 0.1% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. In a preferred embodiment, the antifreeze agent is propylene glycol. Antifreeze agents may be present at a concentration from about 1% to about 10% w/w, from about 2% to about 9% w/w, from about 2% to about 5% w/w or about 4% w/w.

Preservatives suitable for use in the present invention include, but are not limited to, a mixture of 5-chloro-2-methyl-4-isothiazolin-3-one and 2-methyl-4-isothiazolin-3-one, 1, 2-benzisothiazolin-3-one and a mixture of 1, 2-benzisothiazolin-3-one and 2-bromo-2-nitro-1,3-propanediol. In a preferred embodiment the preservative is 1, 2-benzisothiazolin-3-one or a mixture of 5-chloro-2-methyl-4-isothiazolin-3-one and 2-methyl-4-isothiazolin-3-one, 1, 2-benzisothiazolin-3-one. Preservatives may be present at a concentration from about 0.1% to about 1% w/w, from about 0.1% to about 0.3% w/w, about 0.15% w/w or about 0.2% w/w.

Thickeners suitable for use in the present invention include, but are not limited to, magnesium aluminum silicate, hydrophilic fumed silica, aluminum oxide, hydroxy alkyl celluloses and mixtures thereof. Preferred hydroxy alkyl celluloses include hydroxy ethyl cellulose. Thickeners may be present at a concentration from about from about 0.6% to about 4.0% w/w, from about 0.8% to about 2% w/w, about 0.96% w/w or about 1% w/w.

In another embodiment, the present invention is directed to a method of controlling a weed comprising applying the composition of the present invention to the weed or an area in need of weed control.

In another embodiment, the present invention is directed to a method of controlling a weed comprising applying the composition of the present invention sequentially or concurrently with a compound selected from the group consisting of glyphosate, glufosinate, dicamba, 2,4-D and mixtures thereof to the weed or an area in need of weed control.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying and chemigation (a process of applying the composition through the irrigation system).

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

Compositions of the Invention

| Composition | 1 | 2 | 3 |
|---|---|---|---|
| Metribuzin | 15.86% | 15.86% | 15.86% |
| Flumioxazin | — | 12.1% | — |
| 35% Acrylic graft copolymer | 4% | 4% | 3% |
| Alkylphenol ethoxylate free nonionic wetter | 2% | 2% | 1.5% |
| Propylene glycol | 4% | 4% | 4% |
| Polyvinyl alcohol | 0%-2.8% | 0%-2.8% | 0-2.8% |
| Ammonium sulfate | 0%-2.8% | 0%-2.8% | 0-2.8% |
| Potassium citrate | — | 0%-2.8% | 0-2.8% |
| Silicone emulsion | 0.1% | 0.1% | 0.1% |
| Mixture of 1.15% 5-chloro-2-methyl-4-isothiazolin-3-one and 0.35% 2-methyl-4-isothiazolin-3-one | 0.15% | 0.15% | 0.15% |
| Magnesium aluminum silicate | 1% | 1% | 1% |

Tersperse® 2500 is used as the source of 35% graft copolymer and is available from Huntsman Petrochemical Corporation.

Tersperse® 4894 (CAS #68131-39-5) is used as the source of alkylphenol ethoxylate free nonionic wetter and dispersant package (Tersperse is a registered trademark of and is available from Huntsman Petrochemical Corporation).

Selvol® 24-203 (CAS #25213-24-5) or Selvol® 9-523 (CAS #25213-24-5) or Selvol® 15-103 (CAS #9002-89-5) is used as the source of polyvinyl alcohol and are available from Sekisui Specialty Chemicals America, LLC.

Xiameter® AFE-0010 is used as the source of silicone emulsion and is available from Dow Corning Corporation.

Kathon® CG/ICP is used as the source of a mixture of 1.15% 5-chloro-2-methyl-4-isothiazolin-3-one (CAS #26172-55-4) and 0.35% 2-methyl-4-isothiazolin-3-one (CAS #2682-20-4) and is available from Dow Chemical Company.

Veegum® R (CAS #1302-78-9 or #12199-37-0) is used as the source of magnesium aluminum silicate and is available from Vanderbilt Minerals, LLC.

Example 1—Processes for Preparation of Compositions of the Invention

Process 1

The salting-out agent was dissolved in water while stirring. Excipients including antifreeze agent, surfactants, polyvinyl alcohol, antifoam agent, and preservative were then added sequentially under continuous agitation until the composition was homogeneous. Once homogenous, metribuzin and optionally, other active ingredients were added to the composition. After mixing under high-shear agitation, the composition was wet milled to a median particle size of about 2 micrometers ("μM") using zirconia beads to create a mill base. Separately, the thickener was added to water under high-shear agitation to create a thickener dispersion. Post-milling, the thickener dispersion was added and blended with the mill base. If necessary, additional water was added to adjust the composition to the final desired active ingredient(s) concentration.

Process 2

Excipients including antifreeze agent, surfactants, polyvinyl alcohol, antifoam agent, and preservative were added sequentially to water under continuous agitation until the composition was homogeneous. Once homogenous, metribuzin and optionally, other active ingredients were added to the composition. After mixing under high-shear agitation, the composition was wet milled to a median particle size of about 2 micrometers ("μM") using zirconia beads to create a mill base. Separately, the thickener was added to water under high-shear agitation to create a thickener dispersion. Post milling, a solution of the salt in water was added to the mill base with agitation. The thickener dispersion was then added and blended with the mill base. If necessary, additional water was added to adjust the composition to the final desired active ingredient(s) concentration.

Process 3

Thickener was added to water under continuous agitation, which continued until the composition was homogenous (about 15-20 minutes) to create a thickener dispersion. Excipients such as antifreeze agent, surfactants, polyvinyl alcohol, antifoam agent, and preservative were added sequentially to the thickener dispersion under continuous agitation to create excipient solution. Once homogenous, metribuzin and optionally, other active ingredients were added to the excipient solution to create a millable dispersion. After mixing under high-shear agitation, the millable dispersion was wet milled to a median particle size of about 2 μM using zirconia beads to create a mill base. Post milling, a solution of the salt in water was added to the mill base with agitation. If necessary, additional water was added to adjust the composition to the final desired active ingredient(s) concentration.

Example 2-Metribuzin Solubility in Salt Solutions

Method

Metribuzin is partially soluble in water. Because of its partial solubility metribuzin grows crystals in aqueous solutions. It is a discovery of the present invention that, if water solubility of metribuzin is lowered, then crystal growth is inhibited or reduced. To determine if salts could lower the water solubility of metribuzin, metribuzin was added to the saturation point to several concentrations of ammonium sulfate, ammonium acetate and potassium citrate tribasic monohydrate solutions. Results can be seen in FIG. 1.

Results

As seen in FIG. 1, the concentration of each of ammonium sulfate, ammonium acetate and potassium citrate tribasic monohydrate was negatively correlated with the water solubility of metribuzin. These results are evidence that salts can lower the water solubility of metribuzin.

Example 3-Metribuzin Stability

Method

Variations of Composition 1 from Table 1, above, were subjected to extreme temperatures to determine long-term storage stability including the likelihood of large crystals growing that cause clogging of the spray nozzle by performing the wet sieve test. Specifically, these compositions containing various amounts of polyvinyl alcohol and ammonium sulfate were subjected to 2 weeks at 54° C., 4 weeks at 50° C., or 16 weeks at 40° C. accelerated aging. The wet sieve test typically was performed soon after the samples were brought back to room temperature using the following protocol:

A bottle containing the composition was emptied onto a 100-mesh sieve positioned on top of a receiver. Water was added to the bottle, shaken to rinse, and the rinse solution was poured onto the mesh to wash off the material. The rinsing step was repeated until visible quantity of residue on the mesh remained constant. If necessary, additional, minimum streams of water were introduced by way of a squirt or spray bottle to further clear the mesh. Typically, about 250 milliliters of water was used for about 40 grams of sample. The mesh was then dried to a constant weight and observed under a microscope.

Percent wet sieve residue is calculated by the following equation: mass sieve residue/mass sample*100 and presented as a percentage of residue that did not pass through a 100-mesh sieve. Results can be seen in Table 2, below.

TABLE 2

| Composition | 1A | 1B | 1C | 1D |
|---|---|---|---|---|
| polyvinyl alcohol (as active/solid) | — | — | 2.8%[1] | 1.5%[2] |
| ammonium sulfate | — | 2.8% | 2.8% | 2.8% |
| Sieve Residue % (<0.05% desirable) | | | | |
| 54° C. (2 weeks) | 0.036^ | 0.016^ | 0.007* | 0.008 |
| 50° C. (4 weeks) | 0.008* | 0.007* | 0.004* | 0.008 |
| 40° C. (16 weeks) | 0.021^ | 0.006^ | 0.006^ | n/a |

[1]Selvol 24-204 (CAS #25213-24-5) was used as the source of 24% polyvinyl alcohol
[2]Selvol 9-523 (CAS #25213-24-5) was used as the source of 9% polyvinyl alcohol
^denotes presence of macroscopic crystals.
*denotes presence of microscopic crystals.
n/a denotes that data was not taken Results As can be seen in Table 2, the addition of ammonium sulfate reduced crystal growth. Polyvinyl alcohol further reduced crystal growth and sieve residue.

Example 4-Metribuzin Stability

Variations of Composition 2 from Table 1, above, were subjected to extreme temperatures to determine long-term storage stability including % wet sieve residue. Specifically, these compositions containing various amounts of polyvinyl alcohol, ammonium sulfate and potassium citrate were subjected to 2 weeks at 54° C. and 4 weeks at 50° C. accelerated aging. Results can be seen in Table 3 below.

TABLE 3

| Composition | 2A | 2B | 2C | 2D |
|---|---|---|---|---|
| polyvinyl alcohol (as active/solid) | — | — | 2.8%[1] | 2.8%[1] |
| ammonium sulfate | — | 2.8% | 2.8% | — |
| potassium citrate | — | — | — | 2.8% |
| Sieve Residue % (<0.05% desirable) | | | | |
| 54° C. (2 weeks) | 0.020^ | 0.009* | 0.008 | 0.007* |
| 50° C. (4 weeks) | 0.030^ | 0.015^ | 0.010^ | 0.005* |

[1]Selvol 24-204 (CAS #25213-24-5) was used as the source of 24% polyvinyl alcohol
*denotes presence of microscopic crystals.
^denotes presence of macroscopic crystals.

Results

As can be seen in Table 3, the addition of ammonium sulfate reduced crystal growth. Addition of polyvinyl alcohol to compositions containing ammonium sulfate or potassium citrate reduced crystal growth and sieve residue further.

Example 5-Metribuzin Stability

Variations of Composition 3 from Table 1, above, were subjected to extreme temperatures to determine long-term storage stability including % wet sieve residue. Specifically, these compositions containing various amounts of polyvinyl alcohol, ammonium sulfate and potassium citrate were subjected to 2 weeks at 54° C. and 4 weeks at 50° C. accelerated aging. Results can be seen in Table 4 below.

TABLE 4

| Composition | 3A | 3B | 3C | 3D |
|---|---|---|---|---|
| polyvinyl alcohol (as active/solid) | — | 2.8%[1] | 2.8%[1] | 2.0%[2] |
| ammonium sulfate | — | 2.8% | — | 2.8% |
| potassium citrate | — | — | 2.8% | — |
| Sieve Residue % (<0.05% desirable) | | | | |
| 54° C. (2 weeks) | 0.016^ | 0.007 | 0.009 | 0.008 |
| 50° C. (4 weeks) | 0.011^ | 0.010 | 0.006 | 0.008 |

[1]Selvol 24-204 (CAS #25213-24-5) was used as the source of 24% polyvinyl alcohol
[2]Selvol 15-103 (CAS #9002-89-5) was used as the source of 15% polyvinyl alcohol
^denotes presence of macroscopic crystals.

Results

As can be seen in Table 4, the combination of a salting-out agent and polyvinyl alcohol greatly suppressed crystal growth in metribuzin-containing compositions and thus reduces the chance of large crystals clogging the spray nozzle during application.

What is claimed is:

1. A homogenous herbicidal solution comprising:
from about 10% to about 20% w/w metribuzin;
from about 1% to about 6% w/w of a salt selected from ammonium sulfate, ammonium acetate and potassium citrate; and
from about 1% to about 5% w/w polyvinyl alcohol,
wherein w/w denotes weight by total weight of the solution.

2. The solution of claim 1 further comprising from about 1% to about 30% w/w of flumioxazin.

3. The solution of claim 1, wherein:
metribuzin is present at a concentration from about 15% to about 17% w/w;
the salt is ammonium sulfate at a concentration from about 1.8% to about 3.5% w/w; and
polyvinyl alcohol is present at a concentration from about 1.2% to about 3.5% w/w.

4. The solution of claim 3 further comprising flumioxazin is present at a concentration from about 4% to about 24% w/w.

5. The solution of claim 1, further comprising:
from about 3% to about 4% w/w of a 35% acrylic graft copolymer;
from about 1.5% to about 2% w/w of an alkylphenol ethoxylate free nonionic wetter;
about 4% w/w propylene glycol;
about 0.1% w/w of a silicone emulsion;
about 0.15% w/w of a mixture of 1.15% 5-chloro-2-methyl-4-isothiazolin-3-one and 0.35% 2-methyl-4-isothiazolin-3-one; and
about 1% w/w magnesium aluminum silicate.

* * * * *